(12) United States Patent
Berg

(10) Patent No.: US 7,617,616 B1
(45) Date of Patent: Nov. 17, 2009

(54) DIMENSIONAL WEIGHT BOX MEASURING DEVICE

(76) Inventor: Roger M. Berg, 18770 SW. Rigert Rd., Aloha, OR (US) 97007

( * ) Notice: Subject to any disclaimer, the term of this patent is extended or adjusted under 35 U.S.C. 154(b) by 1 day.

(21) Appl. No.: 12/286,263

(22) Filed: Sep. 29, 2008

(51) Int. Cl.
*G01B 3/10* (2006.01)

(52) U.S. Cl. .............................. 33/759; 33/755; 33/757

(58) Field of Classification Search ................ 33/679.1, 33/759, 755, 760–761, 764, 767, 769–771, 33/757
See application file for complete search history.

(56) References Cited

U.S. PATENT DOCUMENTS

| | | | | |
|---|---|---|---|---|
| 61,116 | A * | 1/1867 | Sweet | 33/431 |
| 3,457,649 | A * | 7/1969 | Rodgers | 33/759 |
| 4,942,670 | A * | 7/1990 | Brandt | 33/494 |
| 5,010,656 | A * | 4/1991 | Broselow | 33/759 |
| 5,042,613 | A * | 8/1991 | Hermann | 33/759 |
| 5,894,677 | A * | 4/1999 | Hoffman | 33/759 |
| 6,012,228 | A * | 1/2000 | Fisanich | 33/759 |
| 6,272,761 | B1 * | 8/2001 | Pechter | 33/759 |
| 6,467,180 | B1 * | 10/2002 | Chan | 33/759 |
| 6,598,310 | B1 * | 7/2003 | Odachowski | 33/759 |
| 6,640,460 | B1 * | 11/2003 | Nabarro et al. | 33/759 |
| 6,860,031 | B2 * | 3/2005 | Odachowski | 33/759 |
| 6,935,040 | B2 * | 8/2005 | Alrutz et al. | 33/759 |
| 2002/0148134 | A1* | 10/2002 | Meyer et al. | 33/759 |
| 2003/0014878 | A1* | 1/2003 | Smith | 33/759 |
| 2008/0307666 | A1* | 12/2008 | Mattsson et al. | 33/759 |

* cited by examiner

*Primary Examiner*—Yaritza Guadalupe-McCall
(74) *Attorney, Agent, or Firm*—Ingrid McTaggart

(57) ABSTRACT

A measuring device including an elongate member that defines a first surface and a first end, and a measuring pattern on the first surface, the measuring pattern including a plurality of one inch blocks positioned adjacent each other, each of the one inch blocks centered on a whole inch number as measured from the first end of the elongate member, the measuring pattern including an absence of measuring lines within each of the plurality of the one inch blocks.

9 Claims, 1 Drawing Sheet

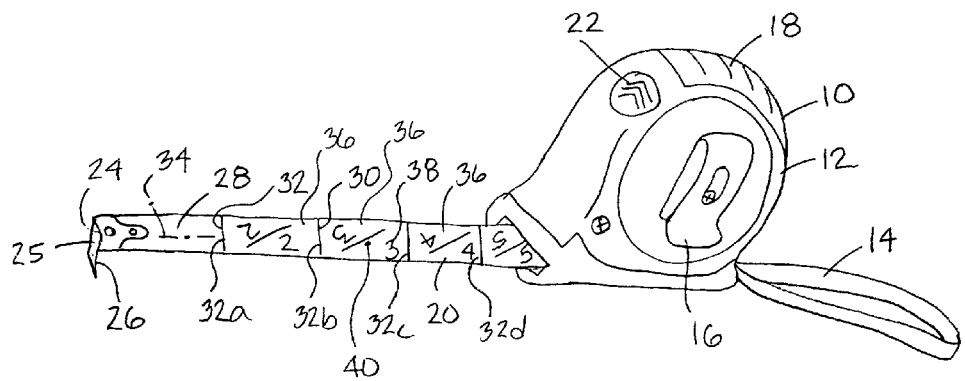
FIG. 1
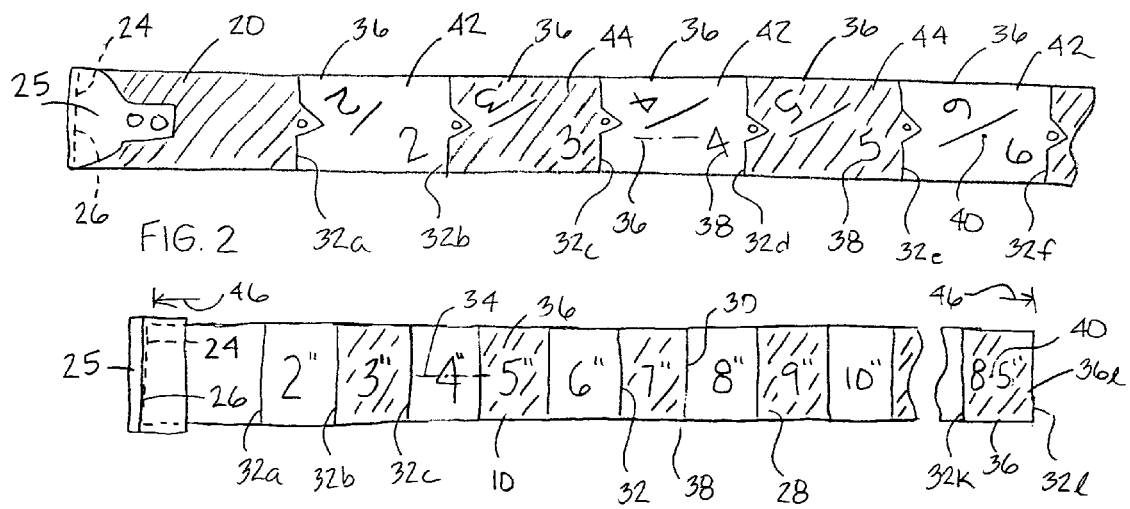
FIG. 2
FIG. 3

DIMENSIONAL WEIGHT BOX MEASURING DEVICE

BACKGROUND

Measurement devices, such as tape measures, may be used to measure the dimensions of an object, such as a shipping package. Recent changes to shipping pricing procedures include measuring the dimensions of a shipping package to determine a "dimension weight" of the package. During such dimension weight measurements, a rounding procedure may be utilized wherein half inch demarcations between each whole inch measurement define the cutoff point for rounding upwardly or downwardly to the nearest whole number. It may be desirable to provide a tape measure that simplifies such dimension weight measurements.

BRIEF DESCRIPTION OF THE DRAWINGS

FIG. 1 is a schematic isometric view of a one example embodiment of a measurement device.

FIG. 2 is a schematic top view of one example embodiment of a measurement surface of a measurement device.

FIG. 3 is a schematic top view of another example embodiment of a measurement surface of a measurement device.

DETAILED DESCRIPTION OF THE DRAWINGS

FIG. 1 is a schematic isometric view of one example embodiment of a measurement device 10. Measurement device 10 may include a housing 12 having a wrist strap 14, a belt clip 16 and cushioned gripping surface 18. Housing 12 may further include a spring biased, retractable measuring member, such as an elongate, coilable metal measuring member 20 that may be coiled within housing 12 when not in use. Device 10 may further include a spring release button 22 that when depressed may activate spring biased coiling of measuring member 20 into housing 12. When not depressed, release button 22 may act as a brake to retain measuring member 20 in a stationary position with respect to housing 12.

Measuring member 20 may define an end surface 24 that may have a downwardly extending stop device 25, including a stop surface 26 which allows end surface 24 to be stationarily positioned at the edge of an object (not shown) during measurement thereof. Measuring member 20 may further include a first surface 28 that may include a measuring pattern 30 thereon. In the embodiment shown measuring pattern 30 is printed on first surface 28 of measuring member 20. However, in other embodiments the measuring pattern 30 may be positioned on first surface 28 by any other method.

Measurement pattern 30, in the embodiment shown, includes a plurality of measurement lines 32 each positioned perpendicular to an elongate axis 34 of measurement member 20. Individual ones of the measurement lines 32 are positioned only at each half inch position, between whole inch positions, along elongate measuring member 20, as measured from first end 24 and as measured from stop surface 26 positioned on an inside position of stop device 25, i.e., positioned on the downwardly extending surface of stop device 25 that is positioned closest to housing 12. The measuring pattern 30 further includes an absence of measuring lines positioned between each half inch position along the elongate measuring member 20. Accordingly, in the example embodiment shown, measurement pattern 30 includes only: a first measurement line 32a positioned at 1½ inches from first end 24; a second measurement line 32b positioned at 2½ inches from first end 24; a third measurement line 32c positioned at 3½ inches from first end 24; a fourth measurement line 32d positioned at 4½ inches from first end 24; and so forth.

Sequential measurement lines 32 define a block 36 positioned therebetween. Within each block 36 a whole number 38 is displayed wherein the whole number 38 corresponds to the measurement in inches of a center point 40 of each block 36 as measured from first end 24 of measuring member 20 and from inside stop surface 26 of downwardly extending stop device 25. For example, a center point 40 is shown within a block 36 defined between measurement lines 32b and 32c, such that center point 40, in this particular block, is positioned at three inches, measured along elongate axis 34, from first end 24 of measuring member 20. Accordingly, whole number 38 positioned within this particular block 36 is the number "3" which represents three inches from first end 24 of measuring member 20. Use of measuring device 10 will now be described.

Still referring to FIG. 1, during use of measuring device 10, an operator may measure a shipping package along all three dimensions, such as the height, width and length of the package. For each measurement the operator may place stop surface 26 over an edge of the package and then determine where the opposing edge of the package is positioned on measuring member 20. If the opposing edge of the package falls within a block 36, the whole number 38 within that block will represent that dimension of the package. If the opposing edge of the package falls exactly on a measurement line 32 between two blocks 36, the edge is considered to fall within the block 36 having the larger whole number 38 therein. Accordingly, an operator using measurement device 10, therefore, will understand that any dimension measurement falling within a block 36 will be represented by the whole number 38 printed within that block 36, without the operator rounding up or down. In other words, device 10 conducts the rounding up or down for the user of the device 10. The operator will understand that a dimension measurement falling directly on a measurement line 32 will be included in the block 36 having the larger of the two whole numbers 38 on either side of the measurement line 32 upon which the dimension measurement is aligned.

Such determinations of measurement are viewed easily and quickly by an operator because measurement device 10 includes no other measurement lines except for the measurement lines 32 positioned between each of the whole inch measurements, as measured from first end 24. This lack of numerous measurement lines, such as a measurement line positioned at every 1/16 th of an inch on standard rulers, allows the operator to clearly and quickly determine an accurate dimension of their package using dimension weight guidelines.

In another embodiment, measuring member 20 may also be described as being manufactured of an inflexible material, such as a flat, wooden ruler.

FIG. 2 is a schematic top view of one example embodiment of a measurement surface 28 of a measurement device 10 wherein measuring pattern 28 includes an alternating pattern of a one inch block 36 of a first color 42 and then a one inch block 36 of a second color 44, wherein each of the one inch blocks 36 of said first and second colors 42 and 44 are centered on a center point 40 of a whole inch number as measured from said first end 24 of the elongate measuring member 20. The measuring pattern 30 of this embodiment, similar to the pattern of FIG. 1, includes an absence of measuring lines positioned in blocks 36 of first and second colors 42 and 44. In the embodiment shown, first color 42 may be white and may include black whole numbers 38. Second color 44 may be black and may include white whole numbers 38.

The pattern of first and second colors 42 and 44 may be described as an alternating pattern of a one inch block 36 of a first color 42 and then a one inch block 36 of a second color 44, wherein each of the one inch blocks 36 of the first and second colors 42 and 44 are centered on a whole inch numbers measured from said first end 24 of elongate measuring member 20. The measuring pattern 30 may further include an absence of measuring lines positioned in the blocks 36 of first and second color 42 and 44. In one embodiment, measuring pattern 30 may define even numbered blocks that are colored a first color 42, and odd numbered blocks are colored a second color 44.

Two whole numbers 38 may be positioned within each block 36, wherein one of the two whole numbers is printed upside down with respect to the other whole number 38, so that measuring device 10 may be read from either direction. This will facilitate use of the device by left handed users and right handed users, and may further simplify the measurement of an object from any direction.

FIG. 3 is a schematic top view of another example embodiment of a measurement device 10. In this embodiment measurement device 10 is a flexible fabric-like ruler, such as a ruler manufactured of cloth or flexible plastic, for example. In this embodiment, measurement device 10 may define a total length 46 of 85½ inches because a last block 36l, representing whole number 85 inches from end surface 24, will define a one inch block 36 centered on a center point 40 positioned at eighty five inches from end surface 24 and from inside surface 26 of stop device 25.

Accordingly, measuring device 10 may be chosen from one of a rigid flat ruler, a flexible tape measure and a coilable metal tape measure. Other variations and modifications of the concepts described herein may be utilized and fall within the scope of the claims below.

I claim:

1. A measuring device, comprising:
    an elongate member that defines a first surface and a first end; and
    a measuring pattern extending along a full length of said first surface, said measuring pattern including an alternating pattern of a one inch block of a first color and then a one inch block of a second color, wherein each of said one inch blocks of said first and second colors are centered on a whole inch number as measured from said first end of said elongate member, said measuring pattern further including an absence of measuring lines positioned in said blocks of first and second color, and wherein each of said one inch blocks includes a printed whole inch number that indicates a distance in inches of a center of each block from said first end.

2. The device of claim 1 wherein said alternating pattern includes a one inch block of said first color centered on a two inch number, on a four inch number, and on a six inch number, as measured from said first end of said elongate member.

3. The device of claim 1 wherein said alternating pattern includes a one inch block of said second color centered on a three inch number, on a five inch number, and on a seven inch number, as measured from said first end of said elongate member.

4. A measuring device, comprising:
    an elongate member that defines a first surface, a first end and an elongate axis; and
    a measuring pattern that extends along an entirety of said first surface, said measuring pattern including a plurality of measuring lines each positioned perpendicular to said elongate axis and individual ones of said plurality of measuring lines positioned only at each half inch position, between whole inch positions, along said elongate member, as measured from said first end of said elongate member, and said measuring pattern further including an absence of measuring lines positioned between each half inch position along said elongate member,
    wherein a region between each of said measuring lines comprises a one inch long block, said measuring pattern further comprising a whole number printed on said first surface in each block, said printed whole number corresponding to a measure in inches of a center point of said block from said first end of said elongate member.

5. The device of claim 4 wherein even numbered blocks are colored a first color, and wherein odd numbered blocks are colored a second color.

6. The device of claim 4 wherein said measuring device is chosen from one of a rigid flat ruler, a flexible tape measure and a coilable metal tape measure.

7. The device of claim 4 wherein said measuring pattern further comprises a second whole number printed on said first surface in each block, said second whole number corresponding to a measure in inches of said center point of said block from said end surface of said elongate member, and said second whole number printed upside down with respect to said whole number.

8. A measuring device, comprising:
    an elongate member that defines a first surface and a first end;
    a measuring pattern on an entire length of said first surface, said measuring pattern including a plurality of one inch blocks positioned adjacent each other, each of said one inch blocks centered on a whole inch number as measured from said first end of said elongate member, said measuring pattern including an absence of measuring lines within each of said plurality of said one inch blocks; and
    a whole number printed on said first surface in each of said one inch blocks, said whole number corresponding to a measure in inches of a center point of said block from said first end of said elongate member.

9. The device of claim 8 wherein said plurality of one inch blocks define a pattern of a colored blocks.

* * * * *